Jan. 31, 1961

D. U. HUNTER 2,969,805

SURGE CONTROLLER

Filed Oct. 1, 1956

INVENTOR
DAVID U. HUNTER
BY
Campbell, Brumbaugh, Free & Graves
HIS ATTORNEYS

United States Patent Office 2,969,805
Patented Jan. 31, 1961

2,969,805

SURGE CONTROLLER

David U. Hunter, Huntington, N.Y., assignor to Fairchild Engine and Airplane Corporation, Bay Shore, N.Y., a corporation of Maryland Filed Oct. 1, 1956, Ser. No. 613,231

13 Claims. (Cl. 137—489)

This invention relates to a safety system for a fluid discharging device, such as a compressor, wherein pressure on the discharge or output side of the device is relieved when a surge condition is approached.

As a compressor approaches the surge condition, the output pressure fluctuates at first rather gently and then very violently. The latter condition is accompanied by excessive outlet temperatures, reversal in the flow of the fluid in the discharge line of the compressor, noise and excessive air vibrations which may produce bending of the compressor blades and, ultimately, complete failure of the compressor.

It is the object of the present invention to provide a safety control system for operating a relief valve on the discharge side of the compressor which during normal operating conditions will be closed, but which upon the occurrence of conditions indicating surge will be opened to prevent damage to the compressor. Sudden positive or negative variations in pressure are indicative of surge, and in the safety system of the present invention sudden increases or decreases of pressure in the discharge line of the compressor are operative to open the relief valve for the duration of these sudden variations. Gradual variations in pressure in the discharge line, such as those which occur during normal operation, however, will not be operative to open the relief valve.

For a complete understanding of the present invention, reference may be made to the detailed description which follows and to the accompanying drawing in which:

Figure 1 is a schematic representation of the present invention in cross-section; and Figure 2 is a fragmentary view illustrating an alternative embodiment thereof.

Referring to the drawing, the conduit 10 represents the discharge line of a centrifugal compressor 11 driven by suitable means, such as an engine A. A relief conduit 12 communicates with the conduit 10 upstream of any control valve for regulating the output of the compressor. The conduit 12 may exhaust to atmosphere or to a waste line. The flow through the conduit 12, however, is normally prevented by the closed relief valve 13 pivotally mounted therein.

The relief valve 13 is adapted to be operated by a pressure controlled actuator 14. The flexible diaphragm of the actuator is connected by means of a rod 15 to the arm 13a of the pivotal relief valve 13. A compression spring 14c acts against the diaphragm. Thus, when the pressure increases within the chamber of the actuator 14, the relief valve 13 is pivoted to open position. Pressure is supplied to the interior of the actuator 14 for opening the valve from the compressor discharge line 10 through a conduit 16 for opening the valve. The pressure, however, is prevented from building up in the actuator 14 because of the escape of fluid through the vent 17 in the upright vent pipe 18. To avoid an unduly large travel of needle 21 in vent 17 and a consequent waste of air, a pressure regulator 19 and a restricted orifice 20 are interposed in the conduit 16 between the discharge line 10 and the vent opening 17.

The vent opening 17 is adapted to be closed by the longitudinal movement of the needle valve 21. The needle valve 21 is formed at the end of a piston rod which is attached to a piston 22. The piston 22 is movably mounted within a chamber of a housing 23 attached to the discharge conduit 10 of the compressor. The piston 22 is acted upon on opposite sides by compression springs 24 and 25, the compression spring 25 offering resistance to the movement of the piston 22 which would cut off the flow through the vent 17, and the compression spring 24 urging the piston in a direction which would cause the needle valve to close the vent 17. The position of the piston 22, and hence also of the needle valve 21, during normal operation of the compressor can be fixed by a set screw 27. The set screw adjusts the position of a disk 28 which serves as a retaining wall for the compression spring 24. It is understood that when the piston 22 is moved to the right as viewed in the figure, the needle valve 21 will close the escape passage through the vent 17, thereby reducing or preventing the escape of fluid and permitting the build-up of pressure in the chamber of the actuator 14 to move the relief valve 13 to open position.

The movement of the piston 22 is adapted to be controlled by the difference of pressure in the chambers 30 and 31. The chamber 30 communicates with the interior of the piston housing to the left of the piston 22 through an opening 30a, and the chamber 31 communicates with the interior of the piston housing to the right of the piston 22 through an opening 31a.

The chamber 30 communicates with the discharge line 10 of the compressor via an opening 32, and the flow into the chamber through the opening 32 is controlled by an inlet check valve 33 normally urged by a compression spring 34 to closed position. The chamber 30 is also provided with a bleed opening 36 to the conduit 10, which bleed opening 36 is considerably smaller than the opening 32.

The chamber 31 communicates with the discharge line 10 of the compressor through an opening 38, and the flow out of the chamber through the opening 38 is controlled by an outlet check valve 39 normally urged by means of a compression spring 40 to closed position. The chamber 31 is also provided with a bleed opening 42, the size of which is very small in comparison to the size of the opening 38.

During normal operating conditions of the compressor, the bleed openings 36, 42 will insure equal pressures in the chambers 30, 31, and the needle valve 21 will be so adjusted in relation to the vent opening 17 that sufficient pressure will not be transmitted to the diaphragm of the actuator 14 to open the relief valve 13. Preferably during normal operating conditions, the inlet and discharge check valves 33, 39, respectively, will be closed. Obviously, gradual variations in pressure in the discharge line 10 of the compressor will not affect the movement of the piston 22 because the pressure within the chambers 30, 31 will be equalized by the passage of fluid into or out of the chambers via the bleed openings. In the event of a sudden pressure increase, however, the inlet check valve 33 will be opened, permitting the pressure to build up in the chamber 30 at a faster rate than it is permitted to build up in the chamber 31, with the result that the piston 22 will be moved to the right as viewed in the drawing. As explained above, the movement of the piston to the right will cause the needle valve to close the vent opening 17 so that the actuator 14 will be operative to open the relief valve 13 by an amount proportional to the pressure in the discharge line 10.

Likewise, in the event of a sudden decrease in pressure in the discharge line 10, the outlet check valve 39 will be opened ot permit the pressure in the chamber 31 to decrease at a more rapid rate than the pressure in the chamber 30, with the result that the relief valve 13 will be opened to relieve the pressure in the dicharge line 10. Of course, when normal opearting conditions are resumed, that is to say, as soon as the pressures in the chambers 30, 31 are equalized, the valve 13 will be automatically closed.

It is, of course, necessary that the response time of the check valves 33, 39 be of such shorter duration that the bleed-off time through the openings 36, 42. The bleed-off time should preferably be at least four to eight times the variation frequency of the pressure in the discharge line 10 as the surge condition is approached, and the filling time of the chamber 30 and the evacuation time of the chamber 31 should be at most two or three cyclse of the variation frequency of the pressure in the discharge line 10 of the compressor.

The invention as thus far described is complete in its operation. As an alternative embodiment, however, provision may be made for controlling the speed of the engine A driving the compressor. Accordingly, a valve 50 is provided in the manifold 51 of the engine, and the valve is adapted to be controlled by a pressure responsive actuator 52. The actuator 52 has a flexible diaphragm 53 which is connected to the valve 50 by a mechanical linkage 54. A chamber 55 is defined within the actuator on one side of the diaphragm, and the chamber 55 is in communication with the pressure chamber of the actuator 14 via a conduit 56. A spring 57, lighter than the spring 14c, also acts upon the diaphragm to maintain the valve 50 open. In this embodiment, in the event of a surge condition, the valve 50 will be closed to reduce the speed of the engine before the actuator 14 is operative to open the valve 13 to dump the fluid via the relief line 12.

The invention has been shown in a single preferred form only and by way of example, and obviously many variations and modifications may be made therein without departing from the spirit of the invention. For example, the needle valve 21 may be applied at the orifice 20. The invention, therefore, is not to be limited to any specified form or embodiment, except in so far as such limitations are set forth in the appended claims.

I claim:

1. A control device for relieving pressure in the event of a surge condition comprising a conduit in communcation with a fluid under pressure, a normally closed relief valve in communication with said conduit, a pair of chambers in communication with the conduit, a check valve controlling the flow of fluid between the conduit and one of the chambers, a check valve controlling the flow of fluid between the conduit and the other of the chambers, one of said check valves opening in the event of a suddent pressure increase in the conduit, and the other opening in the event of a sudden pressure decrease in the conduit, a control member in communication with both chambers and displaceable in response to a pressure differential therebetween, and means operatively connecting the control member and the relief valve to open the relief valve in response to a displacement of the control member.

2. A control device as set forth in claim 1 including a bleed passage between each of said chambers and the conduit so that gradual pressure changes in the conduit will equalize the pressures in the chambers.

3. A control device as set forth in claim 1 wherein the control member displaceable by the differential pressure between said chambers for controlling the operation of the relief valve is the movable element of a relatively movable piston and piston housing, the said chambers communicating with the piston housing on opposite sides of the piston.

4. A control device as set forth in claim 1 wherein the means controlled by the displaceable control member for controlling the operation of the relief valve includes a pressure controlled actuator for operating the relief valve, a pressure transmitting passage between a source of pressure and the pressure sensitive actuator, a vent in said pressure transmitting passage for exhausting the pressure, thereby normally preventing the operation of the pressure controlled actuator, a valve operable to reduce the flow through said vent, and means controlled by the differential pressure between said chambers for controlling the operation of said valve.

5. A control device as set forth in claim 4 wherein the source of pressure for operating the pressure controlled actuator is the pressure in the conduit, said pressure transmitting passage connecting the pressure controlled actuator to the conduit upstream of the relief valve, whereby the relief valve will be adjusted in proportion to the pressure in the conduit.

6. A control device for relieving pressure in the event of a surge condition comprising a discharge conduit in communication with a fluid displacing apparatus, a normally closed relief valve in communication with said discharge conduit, a pair of chambers, a passage connecting each of said chambers with the discharge conduit, a check valve permitting flow through one of said passages only in a direction from the discharge conduit to the chamber, a check valve permitting flow through the other of said passages only in a direction from the chamber to the discharge conduit, a bleed passage connecting each of the chambers with the discharge conduit, the cross-sectional area of the bleed passages being small in relation to the passages with which the check valves are associated, a movable element in communication with both chambers and displaceable in response to a pressure differential therebetween, and means operatively connecting the movable element and the relief valve to open the relief valve in response to a displacement of the movable element.

7. A control device comprising a discharge conduit in communication with a fluid displacing apparatus, a pair of chambers in communication with the discharge conduit, a passage connecting each of said chambers with duit, a passage connecting each of said chambers with the discharge conduit, normally closed valves controlling the flow through each of said passages, one of said valves permitting flow from the discharge conduit into its respective chamber, and the other of said valves permitting flow from its respective chamber to the discharge conduit, a bleed passage between each of said chambers and the discharge conduit and a movable element in communication with both chambers and displaceable in response to a pressure differential in said chambers.

8. A control device for relieving the discharge pressure of a compressor in the event of a surge condition, comprising a discharge conduit, a normally closed relief valve in communication with said discharge conduit, a pair of chambers, a passage connecting each of said chambers with the discharge conduit, a check valve permitting flow through one of said passages only in a direction from the discharge conduit to the chamber, a check valve permitting flow through the other of said passages only in a direction from the chamber to the discharge conduit, a bleed passage connecting each of said chambers with the discharge conduit, the cross-sectional area of the bleed passages being small in relation to the passages with which the check valves are associated, a piston, a piston housing, a passage connecting one end of the piston housing with one of said chambers, a passage connecting the other end of said piston housing with the other of said chambers, whereby relative movement between the piston and piston housing is obtained in the event of a differential pressure within said chambers and means controlled by the relative movement between the piston and the piston housing for controlling the operation of the relief valve.

9. A control device as set forth in claim 8 wherein the means controlled by the relative movement between the piston and the piston housing for controlling the operation of the relief valve includes a pressure controlled actuator for operating the relief valve, a passage connecting the pressure controlled actuator to a source of pressure, a vent in said passage for preventing sufficient pressure to be transmitted to the pressure controlled actuator for operating the relief valve, and a valve for reducing the exhaust through the vent, thereby permitting sufficient pressure to be transmitted to the pressure controlled actuator for operating the relief valve.

10. Apparatus for relieving pressure in the event of a surge condition comprising a normally closed relief valve in communication with the pressure to be relieved, a pair of chambers in communication with the pressure to be relieved, restricted bleed passages connecting the pressure to be relieved with each of said chambers, whereby gradual changes of the pressure tend to equalize the pressures in said chambers, a check valve associated with one of said chambers permitting flow into the respective chamber in the event of a sudden pressure increase, a check valve associated with the other of said chambers permitting flow from the chamber in the event of a sudden pressure decrease, whereby abrupt pressure changes produce a pressure differential in the two chambers, a control member in communication with both chambers and displaceable in response to a differential pressure within said chambers, and means controlled by the displacement of said control member to open the normally closed relief valve.

11. A control device for relieving a pressure in a conduit in the event of a surge condition, comprising a normally closed relief valve in communication with said conduit, a pair of chambers in communication with the conduit, restricted bleed passages connecting said conduit with each of said chambers, whereby gradual pressure changes in the conduit tend to equalize the pressure in said chambers, a check valve controlling the flow of fluid between the conduit and one of the chambers, permitting flow from the conduit to the chamber in the event of a sudden pressure increase in the conduit, a check valve controlling the flow of fluid between the conduit and the other of the chambers, permitting flow from the chamber to the conduit in the event of a sudden pressure decrease in the conduit, means in communication with both chambers and displaceable by a differential pressure within the chambers, and means controlled by said displaceable means for imparting movement to the normally closed valve to open it.

12. A surge detecting device comprising a control member movable in response to a differential pressure acting thereon, means defining a chamber which communicates with said control member, the pressure therein exerting a force in one direction on said control member, means defining a chamber which communicates with the said control member, the pressure therein exerting a force in a different direction on said control member, a restricted passage connecting each of said chambers with the pressure to be controlled, whereby the gradual changes in the fluid pressure tend to equalize the pressures in the said chambers, a larger passage connecting at least one of the chambers with the pressure to be controlled, and a normally closed one-way valve associated with said passage so as to open in the event of a sudden pressure variation, producing a differential pressure which imparts movement to said control member.

13. A surge detecting device comprising a control member movable in response to a differential pressure acting thereon, means defining a chamber which communicates with said control member, the pressure therein exerting a force in one direction on said control member, means defining a chamber which communicates with the said control member, the pressure therein exerting a force in a different direction on said control member, a restricted passage connecting each of said chambers with the pressure to be controlled, whereby the gradual changes in the fluid pressure tend to equalize the pressures in the said chambers, a larger passage connecting each of the chambers with the pressure to be controlled, and a normally closed one-way valve associated with each of said passages, the one-way valve associated with one of the passages permitting a flow of fluid into the respective chamber, and the one-way valve associated with the other of the passages permitting a flow of fluid out of the respective chamber.

References Cited in the file of this patent

UNITED STATES PATENTS

| | | |
|---|---|---|
| 1,210,030 | Baumann | Dec. 26, 1916 |
| 2,000,721 | Standerwick | May 7, 1935 |
| 2,007,777 | Standerwick | July 9, 1935 |
| 2,380,777 | Moss | July 31, 1945 |
| 2,398,619 | Clark et al. | Apr. 16, 1946 |
| 2,424,137 | Ball | July 15, 1947 |
| 2,441,797 | Troeger et al. | May 18, 1948 |
| 2,604,109 | Tuttle | July 22, 1952 |
| 2,764,104 | Yeomans | Sept. 25, 1956 |
| 2,813,672 | Long | Nov. 19, 1957 |
| 2,861,585 | Becker | Nov. 25, 1958 |

FOREIGN PATENTS

| | | |
|---|---|---|
| 696,566 | Great Britain | Sept. 2, 1953 |

UNITED STATES PATENT OFFICE
CERTIFICATION OF CORRECTION

January 31, 1961

Patent No. 2,969,805

David U. Hunter

It is hereby certified that error appears in the above numbered patent requiring correction and that the said Letters Patent should read as corrected below.

Column 3, line 2, for "ot" read -- to --; line 6, for "opecrting" read -- operating --; line 11, for "such" read -- much --; same line, for "that" read -- than --; line 18, for "cyclse" read -- cycles --; lines 48 and 49, for "communcation" read -- communication --; same column, line 56, for "suddent" read -- sudden --; column 6, line 45, list of references cited, under "UNITED STATES PATENTS", for the patent number "2,441,797" read -- 2,441,779 --.

Signed and sealed this 13th day of June 1961.

(SEAL)
Attest:

ERNEST W. SWIDER

Attesting Officer

DAVID L. LADD

Commissioner of Patents